(12) United States Patent
Watanabe

(10) Patent No.: US 10,527,794 B2
(45) Date of Patent: Jan. 7, 2020

(54) POLARIZATION INDEPENDENT OPTICAL ISOLATOR

(71) Applicant: SHIN-ETSU CHEMICAL CO., LTD., Tokyo (JP)

(72) Inventor: Toshiaki Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/819,978

(22) Filed: Nov. 21, 2017

(65) Prior Publication Data

US 2018/0156976 A1 Jun. 7, 2018

(30) Foreign Application Priority Data

Dec. 5, 2016 (JP) .................................. 2016-235778

(51) Int. Cl.
*G02B 6/27* (2006.01)
*G02F 1/09* (2006.01)

(52) U.S. Cl.
CPC ........... *G02B 6/2746* (2013.01); *G02B 6/272* (2013.01); *G02F 1/093* (2013.01)

(58) Field of Classification Search
CPC ........ G02B 6/2746; G02B 6/272; G02B 6/27; G02B 6/2706; G02B 6/2713; G02B 6/2766; G02B 6/2773; G02F 1/09; G02F 1/093; G02F 2203/06
See application file for complete search history.

(56) References Cited

U.S. PATENT DOCUMENTS 5,982,539 A * 11/1999 Shirasaki .................. G02F 1/31
359/484.05

FOREIGN PATENT DOCUMENTS

| JP | H04-51214 A | 2/1992 |
| JP | H04-077713 A | 3/1992 |
| JP | H06-138410 A | 5/1994 |
| JP | H07-020407 A | 1/1995 |
| JP | H07-077669 A | 3/1995 |

OTHER PUBLICATIONS

Shiraishi, et al., "Cascaded optical isolator configuration having high-isolation characteristics over a wide temperature and wavelength range", Optics Letters, vol. 12, No. 7, Jul. 1987.*
Shiraishi et al., Microisolator, Applied Optics, vol. 25, No. 2, Jan. 15, 1986, pp. 311-314 (Year: 1986).*
(Continued)

*Primary Examiner* — Derek S. Chapel
*Assistant Examiner* — Adam W Booher
(74) *Attorney, Agent, or Firm* — Oliff PLC

(57) ABSTRACT

The present invention is a polarization independent optical isolator including two polarizing separation members each configured to separate polarization components of a transmitted light, an absorptive polarizer arranged on optical paths of separated transmitted lights and corresponding to a plane of polarization of each separated transmitted light, and a Faraday rotator, wherein the Faraday rotator is arranged downstream of the absorptive polarizer in a forward direction. As a result, there can be provided a polarization independent optical isolator that requires no stray light processing of separated optical feedback and shows high isolation.

3 Claims, 4 Drawing Sheets

(a) Forward direction (b) Backward direction

(56) References Cited

OTHER PUBLICATIONS

May 3, 2018 Extended European Search Report issued in European Application No. 17001966.5.
K. Shiraishi "New Configuration of Polarisation-Independent Isolator Using a Polarisation-Dependent One." Electronics Letters, 1991, vol. 27, No. 4, pp. 302-303.
Aug. 20, 2019 Office Action issued in Japanese Patent Application No. 2016-235778.

* cited by examiner (a) Forward direction (b) Backward direction (a) Forward direction (b) Backward direction (a) Forward direction (b) Backward direction (a) Forward direction (b) Backward direction Prior Art

POLARIZATION INDEPENDENT OPTICAL ISOLATOR

TECHNICAL FIELD

The present invention relates to an optical component for use in optical communication and optical measurement, that is to say, an optical isolator used for preventing reflections from re-entering from a fiber end or a lens end to a light source, and more particularly to a polarization independent optical isolator that can be used regardless of a polarization state of an incident light.

BACKGROUND ART

In optical communication and optical measurement, a light emitted from a semiconductor laser can reflect at the surface of a member provided on a transmission path and re-enter the semiconductor laser, which makes the laser oscillation instable. To block this reflective optical feedback, an optical isolator using a Faraday rotator, which can non-reciprocally rotate a plane of polarization, is used.

In high-speed communication using the semiconductor laser, an optical isolator usable for a non-polarized light is becoming necessary with integration of multiple components in a module.

A basic structure of a conventional polarization independent optical isolator includes, as shown in FIG. 4, a Faraday rotator 2 and a half-wave plate 4 arranged between two birefringent crystals 6.

FIG. 4(a) shows light traveling in the forward direction. A light incident on one of the birefringent crystals 6 is first separated into an ordinary ray and an extraordinary ray having planes of polarization different by 90 degrees. Then, the polarizations are rotated by the Faraday rotator 2 by 45 degrees and by the half-wave plate 4 by 45 degrees, resulting in a total rotation of 90 degrees so that the ordinary ray and the extraordinary ray are interchanged. Thus, both rays are coupled at the second birefringent crystal 6 (the birefringent crystal 6 on the right in the figure) and exit the optical isolator.

FIG. 4(b) shows light traveling in the backward direction. Like the forward direction, a light incident on one of the birefringent crystals 6 is first separated into an ordinary ray and an extraordinary ray having planes of polarization different by 90 degrees. Then, the polarizations are rotated by the half-wave plate 4 by 45 degrees, and reversely rotated by the Faraday rotator 2 by 45 degrees to the rotational direction of the half-wave plate 4. Thus, the polarization directions of both rays are not changed (from the polarization directions when exiting the birefringent crystal 6), and the rays are not coupled at the second birefringent crystal 6 (the birefringent crystal 6 on the left in the figure), diverging more and more.

The reason is that the half-wave plate rotates a plane of polarization relative to a propagation direction, while the Faraday rotator rotates a plane of polarization relative to a magnetization direction.

CITATION LIST

Patent Literature

Patent Document 1: Japanese Unexamined Patent publication (Kokai) No. H04-51214

SUMMARY OF INVENTION

Technical Problem

The mechanism in which the optical feedback is separated like the conventional polarization independent optical isolator requires some separation distance to obtain an isolator function. When the separation distance of the optical feedback is increased to enhance the isolator function, the crystal lengths of the birefringent crystals need to be increased. For example, when $TiO_2$ is used as the birefringent crystals, the separation distance is about one tenth of the crystal length, so that a couple of crystals having a length of 10 mm are required to ensure a separation distance of 1 mm.

Patent Document 1 attempts to deviate the optical feedback from the central axis of an incident light to enhance the isolator function. However, this structure uses four birefringent crystals and thus enlarges the optical isolator.

Furthermore, the structure of the conventional polarization independent optical isolator needs to dispose optical absorbers 7 (see FIG. 4) or the like for stray light processing of the optical feedback separated in a module. Moreover, the structure of the conventional polarization independent optical isolator has still room for improvement in isolation (backward insertion loss).

The present invention was accomplished in view of the above-described problems. It is an object of the present invention to provide a polarization independent optical isolator that requires no stray light processing of separated optical feedback and shows high isolation.

Solution to Problem

To achieve this object, the present invention provides a polarization independent optical isolator comprising: two polarizing separation members each configured to separate polarization components of a transmitted light; an absorptive polarizer arranged on optical paths of separated transmitted lights and corresponding to a plane of polarization of each separated transmitted light; and a Faraday rotator, wherein the Faraday rotator is arranged downstream of the absorptive polarizer in a forward direction.

Such a polarization independent optical isolator, which includes two polarizing separation members, an absorptive polarizer, and a Faraday rotator, in which the Faraday rotator is arranged downstream of the absorptive polarizer in the forward direction, can absorb the optical feedback by the absorptive polarizer and thus requires no stray light processing of the separated optical feedback and shows high isolation.

A half-wave plate may be arranged downstream of the absorptive polarizer in the forward direction.

Alternatively, a half-wave plate may be arranged upstream of the absorptive polarizer in the forward direction.

In this way, the order of the absorptive polarizer and the half-wave plate can be changed.

Preferably, the polarization independent optical isolator comprises two Faraday rotators, and one of the Faraday rotators is arranged upstream of the absorptive polarizer in the forward direction.

Such an arrangement of the Faraday rotators and the absorptive polarizer allows a possible leak light transmitted through the absorptive polarizer in the backward direction to be rotated by the second Faraday rotator by 45 degrees. Thus, the leak light is not coupled at the second polarizing separation member and exits outside the optical path. This enables the polarization independent optical isolator to have higher isolation.

The polarizing separation members are preferably a polarizing prism.

When the polarizing prism is used as the polarizing separation members, the polarizing separation member length in the light propagation direction can be reduced, and thus the polarization independent optical isolator can be downsized.

Advantageous Effects of Invention

In the polarization independent optical isolator of the present invention, the optical feedback is absorbed by the absorptive polarizer. Therefore, no stray light processing of the separated optical feedback is required. Moreover, this optical isolator can exhibit higher isolation than the conventional polarization independent optical isolator.

DESCRIPTION OF EMBODIMENTS

Hereinafter, exemplary embodiments of the present invention will be described in detail with reference to the drawings, but the present invention is not limited thereto.

As described above, the structure of the conventional polarization independent optical isolator needs to dispose optical absorbers or the like for stray light processing of the optical feedback separated in a module. Moreover, the structure of the conventional polarization independent optical isolator has still room for improvement in isolation.

In view of this, the present inventor keenly conducted studies on a polarization independent optical isolator that requires no stray light processing of the separated optical feedback and shows high isolation. As a result, the present inventor found that a polarization independent optical isolator that includes two polarizing separation members, an absorptive polarizer, and a Faraday rotator, in which the Faraday rotator is arranged downstream of the absorptive polarizer in the forward direction can absorb the optical feedback by the absorptive polarizer and thus requires no stray light processing of the separated optical feedback and shows high isolation, thereby bringing the present invention to completion.

The inventive polarization independent optical isolator at least includes two polarizing separation members each configured to separate polarization components of a transmitted light, an absorptive polarizer arranged on optical paths of separated transmitted lights and corresponding to a plane of polarization of each separated transmitted light, and a Faraday rotator. The Faraday rotator is arranged downstream of the absorptive polarizer in a forward direction.

Such a polarization independent optical isolator, which includes two polarizing separation members, an absorptive polarizer, and a Faraday rotator, in which the Faraday rotator is arranged downstream of the absorptive polarizer in the forward direction, can absorb the optical feedback by the absorptive polarizer and thus requires no stray light processing of the separated optical feedback and shows high isolation.

First, a polarization independent optical isolator according to a first embodiment of the present invention will be described with reference to FIG. 1.

Figure 1:
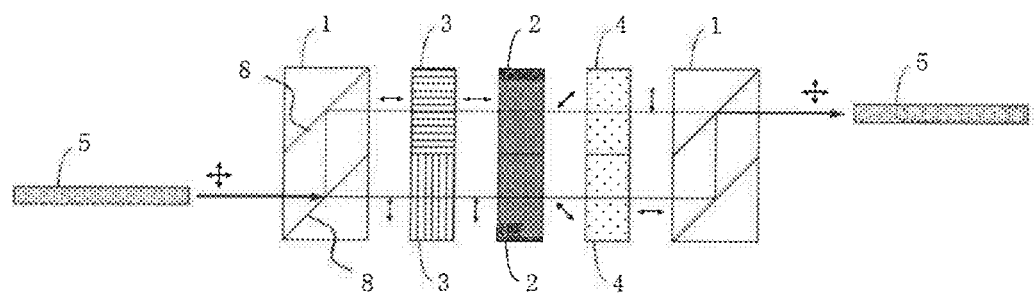
FIGS. 1(a)-(b) are explanatory diagrams showing an exemplary structure and light traveling of a polarization independent optical isolator according to a first embodiment of the present invention.
Figure 1:
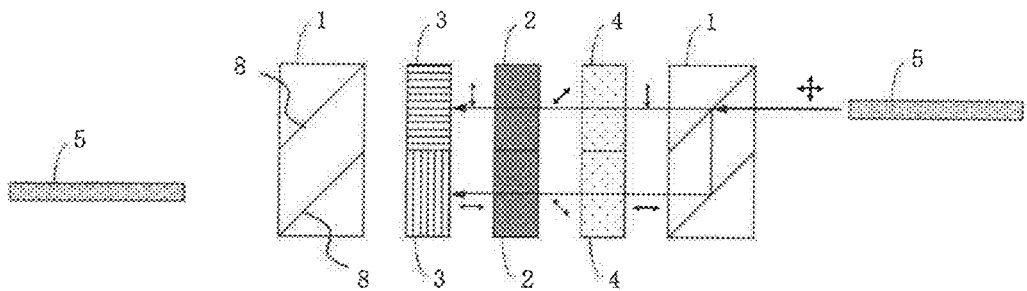

The inventive polarization independent optical isolator may have, for example, a structure shown in FIG. 1 (the first embodiment of the present invention). FIG. 1 is a top view of the polarization independent optical isolator. In this case, a half-wave plate 4 is arranged downstream of an absorptive polarizer 3 in the forward direction; a first polarizing separation member 1, an absorptive polarizer 3, a Faraday rotator 2, a half-wave plate 4, and a second polarizing separation member 1 are arranged in this order. Moreover, two absorptive polarizers 3 are arranged such that each absorptive polarizer corresponds to a plane of polarization of one of transmitted lights separated by the polarizing separation member 1.

FIG. 1(a) is a diagram showing light traveling in the forward direction. A non-polarized light incident from an optical fiber 5 is separated by the first polarizing separation member 1 (the polarizing separation member on the left in the figure) into an ordinary ray and an extraordinary ray having planes of polarization different by 90 degrees. Then, these rays reach and pass through the absorptive polarizer 3 without loss since the absorptive polarizer 3 is arranged so as to correspond to a plane of polarization of each ray. Subsequently, the polarizations are rotated by the Faraday rotator 2 by 45 degrees and by the half-wave plate 4 by additional 45 degrees, resulting in a total rotation of 90 degrees so that the ordinary ray and the extraordinary ray are interchanged. Then, both rays are coupled at the second polarizing separation member 1 (the polarizing separation member 1 on the right in the figure) and exit the optical isolator.

FIG. 1(b) is a diagram showing light travelling in the backward direction. The optical feedback incident into the right polarizing separation member 1 is separated into an ordinary ray and an extraordinary ray having planes of polarization different by 90 degrees, like the forward direction. Then, the polarizations are rotated by the half-wave plate 4 by 45 degrees, and reversely rotated by the Faraday rotator 2 by 45 degrees to the rotational direction of the half-wave plate 4. Thus, the polarization directions of both rays are not changed (from the polarization directions when exiting the polarizing separation member 1) and differ from that of the subsequent absorptive polarizer 3 by 90 degrees. Therefore, the optical feedback is absorbed by the absorptive polarizer 3 and does not re-enter the left light fiber 5.

The arrangement in the first embodiment of the present invention allows the optical feedback to be absorbed by the absorptive polarizer and requires no stray light processing of the separated optical feedback, thus providing a polarization independent optical isolator having high isolation.

In this embodiment, the order of the Faraday rotator 2 and the half-wave plate 4 may be changed, and the function as the inventive polarization independent optical isolator can be obtained even when the order of the Faraday rotator 2 and the half-wave plate 4 is changed for an optical path of each separated transmitted light.

Next, a polarization independent optical isolator according to a second embodiment of the present invention will be described with reference to FIG. 2.

Figure 2:
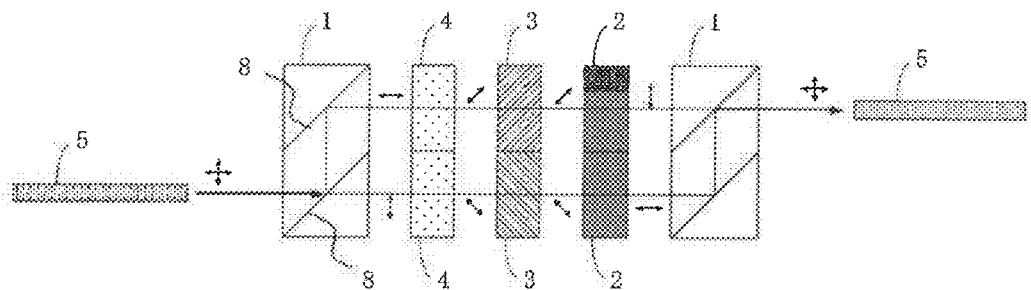
FIGS. 2(a)-(b) are explanatory diagrams showing an exemplary structure and light traveling of a polarization independent optical isolator according to a second embodiment of the present invention.
Figure 2:
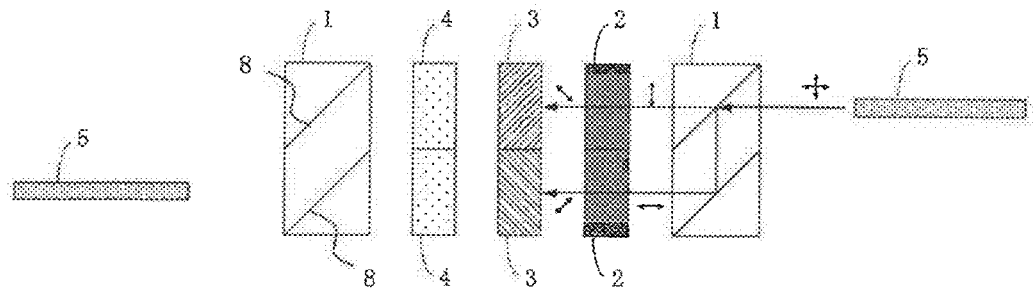

The inventive polarization independent optical isolator may also have, for example, a structure shown in FIG. 2 (the second embodiment of the present invention). FIG. 2 is also a top view of the polarization independent optical isolator, like FIG. 1. In this case, a half-wave plate 4 is arranged upstream of an absorptive polarizer 3 in the forward direction; a first polarizing separation member 1, a half-wave plate 4, an absorptive polarizer 3, a Faraday rotator 2, and a second polarizing separation member 1 are arranged in this order. Moreover, two absorptive polarizers 3 are arranged such that each absorptive polarizer corresponds to a plane of polarization of one of transmitted lights separated by the polarizing separation member 1.

FIG. 2(*a*) is a diagram showing light traveling in the forward direction. A non-polarized light incident from an optical fiber 5 is separated by the first polarizing separation member 1 (the polarizing separation member 1 on the left in the figure) into an ordinary ray and an extraordinary ray having planes of polarization different by 90 degrees. Then, the polarizations are rotated by the half-wave plate 4 by 45 degrees. Subsequently, both rays reach and pass through the absorptive polarizer 3 without loss since the absorptive polarizer 3 is arranged so as to correspond to a plane of polarization of each ray. Further, the polarizations are each rotated by the Faraday rotator 2 by 45 degrees so that the ordinary ray and the extraordinary ray are interchanged. Then, both rays are coupled at the second polarizing separation member 1 (the polarizing separation member 1 on the right in the figure) and exit the optical isolator.

FIG. 2(*b*) is a diagram showing light travelling in the backward direction. The optical feedback incident into the right polarizing separation member 1 is separated into an ordinary ray and an extraordinary ray having planes of polarization different by 90 degrees, like the forward direction. Then, the polarizations are reversely rotated by the Faraday rotator 2 by 45 degrees to the rotational direction in the forward direction. Thus, the resulting polarization directions are different from that of the subsequent absorptive polarizer 3. Therefore, the optical feedback is absorbed by the absorptive polarizer 3 and does not re-enter the left optical fiber 5.

Like the first embodiment of the present invention, the arrangement in the second embodiment of the present invention allows the optical feedback to be absorbed by the absorptive polarizer and requires no stray light processing of the separated optical feedback, thus providing a polarization independent optical isolator having high isolation.

Next, a polarization independent optical isolator according to a third embodiment of the present invention will be described with reference to FIG. 3.

Figure 3:
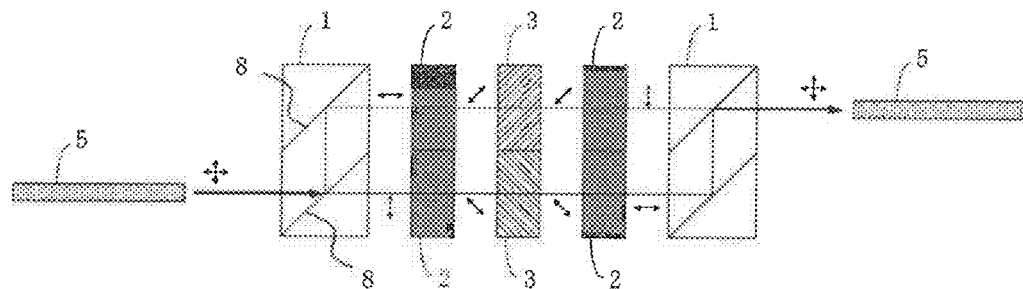
FIGS. 3(a)-(b) are explanatory diagrams showing an exemplary structure and light traveling of a polarization independent optical isolator according to a third embodiment of the present invention.
Figure 3:
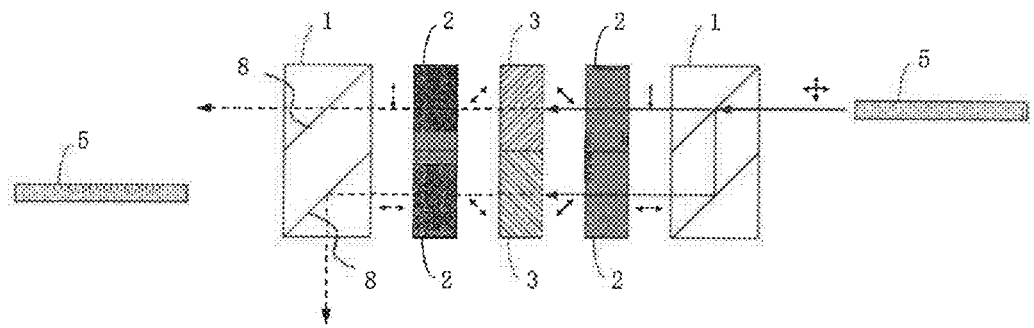

The inventive polarization independent optical isolator may also have, for example, a structure shown in FIG. 3 (the third embodiment of the present invention). FIG. 3 is also a top view of the polarization independent optical isolator, like FIG. 1. In this case, in the forward direction, a Faraday rotator 2 is arranged upstream of a absorptive polarizer 3, while another Faraday rotator 2 is arranged downstream of the absorptive polarizer 3; a first polarizing separation member 1, a first Faraday rotator 2, an absorptive polarizer 3, a second Faraday rotator 2, and a second polarizing separation member 1 are arranged in this order. Moreover, two absorptive polarizers 3 are arranged such that each absorptive polarizer corresponds to a plane of polarization of one of transmitted lights separated by the polarizing separation member 1.

FIG. 3(*a*) is a diagram showing light traveling in the forward direction. A non-polarized light incident from a left optical fiber 5 is separated by the first polarizing separation member 1 (the polarizing separation member 1 on the left in the figure) into an ordinary ray and an extraordinary ray having planes of polarization different by 90 degrees. Then, the polarizations are rotated by first Faraday rotator 2 (the Faraday rotator 2 on the left in the figure) by 45 degrees. Subsequently, both rays reach and pass through the absorptive polarizer 3 without loss since the absorptive polarizer 3 is arranged so as to correspond to a plane of polarization of each ray. Further, the polarizations are each rotated by the second Faraday rotator 2 (the Faraday rotator 2 on the right in the figure) by 45 degrees so that the ordinary ray and the extraordinary ray are interchanged. Then, both rays are coupled at the second polarizing separation member 1 (the polarizing separation member 1 on the right in the figure) and exit the optical isolator.

FIG. 3(*b*) is a diagram showing light travelling in the backward direction. The optical feedback incident into the right polarizing separation member 1 is separated into an ordinary ray and an extraordinary ray having planes of polarization different by 90 degrees, like the forward direction. Then, the polarizations are reversely rotated by the right Faraday rotator 2 by 45 degrees to the rotational direction in the forward direction. Thus, the resulting polarization directions are different from that of the subsequent absorptive polarizer 3. Therefore, the optical feedback is absorbed by the absorptive polarizer 3 and does not re-enter the left optical fiber 5.

Furthermore, the structure of FIG. 3 allows a possible leak light transmitted through the absorptive polarizer 3 in the backward direction to be rotated by the second Faraday rotator 2 (the Faraday rotator 2 on the left in the figure) by 45 degrees. Thus, the leak light is not coupled at the second polarizing separation member 1 (the polarizing separation member 1 on the left in the figure) and exits outside the optical path. Therefore, the polarization independent optical isolator according to the third embodiment of the present invention can have higher isolation.

Additionally, in the structure of FIG. 3, another absorptive polarizer 3 may be further provided between the first polarizing separation member 1 (the polarizing separation member 1 on the left in the figure) and the first Faraday rotator 2 (the Faraday rotator 2 on the left in the figure). That is, in the forward direction, the first polarizing separation member 1, the first absorptive polarizer 3, the first Faraday rotator 2, the second absorptive polarizer 3, the second Faraday rotator 2, and the second polarizing separation member 1 may be arranged in this order.

This structure allows a possible leak light transmitted through the first absorptive polarizer 3 in the backward direction to be absorbed by the second absorptive polarizer 3.

The polarizing separation members 1 used in the present invention are not particularly limited as long as they have a polarization separation function for separating polarization components of a transmitted light. For example, like the structure of the conventional polarization independent optical isolator (see FIG. 4), the polarizing separation members 1 may be birefringent crystals.

However, when the birefringent crystal is used as the polarizing separation members 1, the crystal length of the birefringent crystal needs to be increased to increase the separation distance of the transmitted light. For example, even if $TiO_2$, which has a relatively high polarization separation performance, is used as the birefringent crystal, the separation distance is about one tenth of the crystal length, so that a couple of crystals having a length of 10 mm are required to ensure a separation distance of 1 mm.

Accordingly, to downsize the polarization independent optical isolator, a polarizing prism or a polarizing beam splitter is preferably used as the polarizing separation members 1. Moreover, the polarizing separation members 1 are preferably configured such that the propagation direction of each transmitted light separated by the polarizing separation member 1 is parallel to the propagation direction of the transmitted light incident on the polarizing separation member 1.

For the Faraday rotator 2, the absorptive polarizer 3, and the half-wave plate 4 used in the present invention, any known materials can be used without particular limitation. For example, the Faraday rotator may be bismuth-substituted rare earth iron garnet; the absorptive polarizer may be Polarcor (product name, available from Corning Co., Inc.); the half-wave plate may be crystalized quartz.

Moreover, the optical isolator is generally provided with a magnet for applying a magnetic field to the Faraday rotator 2. In addition to this, any components may be added as needed.

EXAMPLE

Hereinafter, the present invention will be more specifically described with reference to examples and a comparative example, but the present invention is not limited thereto.

Example 1

In Example 1, the structure of FIG. 1 was adopted. In this example, the optical isolator was designed for a light having 1550 nm wavelength.

First, two polarizing prisms 1 having 1.0 mm length×2.0 mm width×1.0 mm height were prepared as the polarizing separation members 1. Each polarizing prism 1 was configured as shown in FIG. 1 such that three prisms were bonded with polarization separation films 8. Such a structure allows the propagation directions of transmitted lights separated with polarization components to be parallel to the propagation direction of the incident transmitted light. Moreover, an antireflection film against air was provided at the light transmission surface. The optical separation distance of the polarizing prism 1 was 1.0 mm.

Next, an absorptive polarizer 3 (Polarcor), a 45-degrees Faraday rotator 2 (bismuth-substituted rare earth iron garnet with a length of 540 µm) designed to have a Faraday rotation angle of 45 degrees for light with 1550 nm wavelength in a predetermined magnetic field, and a half-wave plate 4 were bonded with an epoxy-based adhesive (refractive index 1.48) in this order, and the assembly was cut into two chips with 1.0 mm width×1.0 mm height.

The light transmission surfaces on the incident surface (polarizing prism 1 side) of the absorptive polarizer 3 and the exit surface (polarizing prism 1 side) of the half-wave plate 4 had antireflection films against air, and the Faraday rotator 2 had antireflection films against epoxy at both ends so as to prevent reflection at the interface with the epoxy-based adhesive.

The two polarizing prisms 1 and the two chips were arranged as shown in FIG. 1, and a SmCo magnet for applying a predetermined magnetic field was provided on each Faraday rotator 2 of the chips to manufacture a polarization independent optical isolator. In this optical isolator, the absorptive polarizer 3 was arranged so as to correspond to planes of polarization of transmitted lights separated by the polarizing prism 1, and the half-wave plate 4 was aligned with the crystal axis so as to obtain a desired rotational angle.

FIG. 1(a) is a diagram showing light traveling in the forward direction. A non-polarized light incident from the left optical fiber 5 is separated at the interface of one of the polarization separation films 8 of the first polarizing prism 1 (the polarizing prism 1 on the left in the figure) into a polarization component parallel to a lower plane (a plane on which the polarizing prism 1 was fixed to a plate (not shown)) and a polarization component perpendicular to the lower plane. The polarization component parallel to the lower plane exits the polarizing prism 1 as it is and reaches the absorptive polarizer 3. On the other hand, the polarization component perpendicular to the lower plane is further reflected at the interface of the other polarization separation film 8 and then exits the polarizing prism 1.

The rays that exit the polarizing prism 1 reach and pass through the absorptive polarizer 3 without loss since the absorptive polarizer 3 is arranged so as to correspond to a plane of polarization of each ray. Subsequently, the polarizations are rotated by the Faraday rotator 2 by degrees and by the half-wave plate 4 by 45 degrees, resulting in a total rotation of 90 degrees.

The polarization made perpendicular to the lower plane by the 90-degrees rotation is then reflected by the polarization separation films 8 of the second polarizing prism 1 (the polarizing prism 1 on the right in the figure). On the other hand, the polarization made parallel to the lower plane by the 90-degrees rotation passes through the second polarizing prism 1 as it is. Therefore, both rays are coupled at the second polarizing prism 1 and exit the optical isolator.

FIG. 1(b) is a diagram showing light travelling in the backward direction. The optical feedback incident into the right polarizing prism 1 is separated into a polarization component parallel to the lower plane and a polarization component perpendicular to the lower plane, like the forward direction. Then, the polarizations are rotated by the half-wave plate 4 by 45 degrees, and reversely rotated by the Faraday rotator 2 by 45 degrees to the rotational direction of: the half-wave plate 4. Thus, the polarization directions of both rays are not changed (from the polarization directions when exiting the right polarizing prism 1) and differ from that of the subsequent absorptive polarizer 3 by 90 degrees. Therefore, the optical feedback is absorbed by the absorptive polarizer 3 and does not re-enter the light fiber 5.

With respect to the manufactured polarization independent optical isolator, insertion loss and isolation in the forward direction were measured. As a result, the insertion loss was 0.35 dB, and the isolation was 42 dB.

Example 2

In Example 2, the structure of FIG. 3 was adopted. In this example, the optical isolator was designed for a light having 1550 nm wavelength.

First, two polarizing prisms 1 having 1.0 mm length×2.0 mm width×1.0 mm height were prepared as the polarizing separation members 1. Each polarizing prism 1 was configured as shown in FIG. 3 such that three prisms were bonded with polarization separation films 8. Such a structure allows the propagation directions of transmitted lights separated with polarization components to be parallel to the propagation direction of the incident transmitted light. Moreover, an antireflection film against air was provided at the light transmission surface. The optical separation distance of the polarizing prism 1 was 1.0 mm.

Next, an absorptive polarizer 3 (Polarcor) and two 45-degrees Faraday rotators 2 (bismuth-substituted rare earth iron garnet with a length of 540 μm) designed to have a Faraday rotation angle of 45 degrees for light with 1550 nm wavelength in a predetermined magnetic field were prepared and bonded with an epoxy-based adhesive such that the absorptive polarizer 3 was sandwiched between the two Faraday rotators 2. Further, the assembly was cut into two chips with 1.0 mm width×1.0 mm height.

Each Faraday rotator 2 had an antireflective film against air at the polarizing prism 1 side and an antireflective film against epoxy at the absorptive polarizer 3 side.

The two polarizing prisms 1 and the two chips were arranged as shown in FIG. 3, and a SmCo magnet for applying a predetermined magnetic field was provided on each Faraday rotator 2 of the chips to manufacture a polarization independent optical isolator. In this optical isolator, the absorptive polarizer 3 was arranged so as to correspond to planes of polarization of transmitted lights separated by the polarizing prism 1 and rotated by one of the Faraday rotators 2.

FIG. 3(*a*) is a diagram showing light traveling in the forward direction. A non-polarized light incident from the left optical fiber 5 is separated at the interface of one of the polarization separation films 8 of the first polarizing prism 1 (the polarizing prism 1 on the left in the figure) into a polarization component parallel to the lower plane and a polarization component perpendicular to the lower plane. The polarization component parallel to the lower plane exits the polarizing prism as it is and reaches the Faraday rotator 2. On the other hand, the polarization component perpendicular to the lower plane is further reflected at the interface of the other polarization separation film 8 and then exits the polarizing prism 1.

The polarized rays exiting the polarizing prism 1 are rotated by the first Faraday rotator 2 (the Faraday rotator 2 on the left in the figure) by 45 degrees. Subsequently, both rays reach and pass through the absorptive polarizer 3 without loss since the absorptive polarizer 3 is arranged so as to correspond to a plane of polarization of each ray. Further, the polarizations are each rotated by the second Faraday rotator 2 (the Faraday rotator 2 on the right in the figure) by 45 degrees, resulting in a total rotation of 90 degrees.

The polarization made perpendicular to the lower plane by the 90-degrees rotation is then reflected by the polarization separation films 8 of the second polarizing prism 1 (the polarizing prism 1 on the right in the figure). On the other hand, the polarization made parallel to the lower plane by the 90-degrees rotation passes through the second polarizing prism 1 as it is. Therefore, both rays are coupled at the second polarizing prism 1 and exit the optical isolator.

FIG. 3(*b*) is a diagram showing light travelling in the backward direction. The optical feedback incident into the right polarizing prism 1 is separated into a polarization component parallel to the lower plane and a polarization component perpendicular to the lower plane, like the forward direction. Then, the polarizations are reversely rotated by the Faraday rotator 2 by 45 degrees to the rotational direction in the forward direction. Thus, the resulting polarization directions are different from that of the subsequent absorptive polarizer 3. Therefore, the optical feedback is absorbed by the absorptive polarizer 3 and does not re-enter the left optical fiber 5.

Furthermore, this structure allows a possible leak light transmitted through the absorptive polarizer 3 in the backward direction to be rotated by the second Faraday rotator 2 (the Faraday rotator 2 on the left in the figure) by 45 degrees. Thus, the leak light is not coupled at the second polarizing prism 1 (the polarizing prism 1 on the left in the figure) and exits outside the optical path.

With respect to the manufactured polarization independent optical isolator, insertion loss and isolation in the forward direction were measured. As a result, the insertion loss was 0.42 dB, and the isolation was 54 dB.

Comparative Example 1

Figure 4:
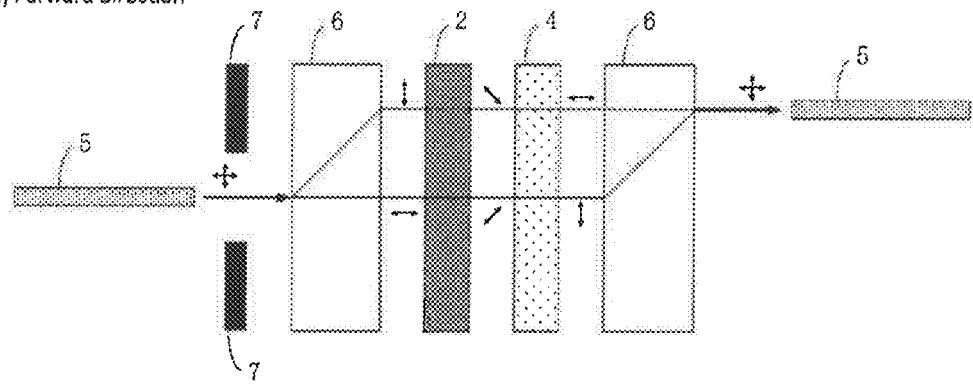
FIGS. 4(a)-(b) are explanatory diagrams showing a structure and light traveling of: a conventional polarization independent optical isolator.
Figure 4:
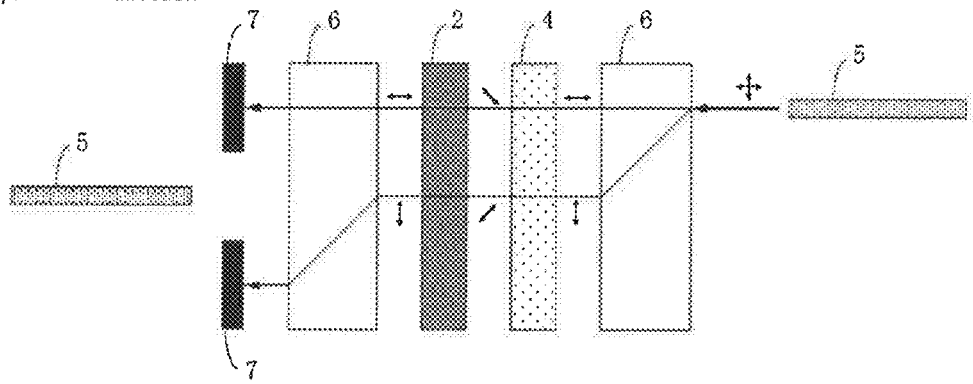

In Comparative Example 1, the structure of FIG. 4 was adopted as the conventional structure. In this example, the optical isolator was designed for a light having 1550 nm wavelength.

First, two birefringent crystals 6 having 10.0 mm length× 3.0 mm width×1.0 mm height were prepared. The optical separation distance of each birefringent crystal 6 was 1.0 mm. Furthermore, a 45-degrees Faraday rotators 2 (bismuth-substituted rare earth iron garnet with a length of 540 μm) designed to have a Faraday rotation angle of 45 degrees for light with 1550 nm wavelength in a predetermined magnetic field and a half-wave plate 4 were prepared.

Next, the first birefringent crystal 6, the Faraday rotator 2, the half-wave plate 4, and the second birefringent crystal 6 were bonded with an adhesive in this order.

Each birefringent crystal 6 had an antireflective film against air at the optical fiber 5 side, and the Faraday rotator 2 had antireflective films against epoxy at both ends.

Furthermore, a SmCo magnet for applying a predetermined magnetic field was provided on the Faraday rotator 2 to manufacture a polarization independent optical isolator.

With respect to the manufactured polarization independent optical isolator, insertion loss and isolation in the forward direction were measured. As a result, the insertion loss was 0.38 dB, and the isolation was 38 dB.

As understood from the above, Examples 1 and 2, which included the absorptive polarizer and in which the Faraday rotator was arranged downstream of the absorptive polarizer in the forward direction, did not need to dispose optical absorbers or the like for stray light processing of the optical feedback, unlike Comparative Example 1, which included no absorptive polarizer. In addition, Examples 1 and 2 showed higher isolation than Comparative Example 1. Furthermore, Example 2, which included two Faraday rotators and in which one of the Faraday rotators was arranged upstream of the absorptive polarizer in the forward direction, showed higher isolation than Example 1. Moreover, Examples 1 and 2 require no TiO crystals as expensive and large birefringent crystals, and could reduce the length of the polarization independent optical isolator, compared with the case using TiO crystals as the birefringent crystals.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A polarization independent optical isolator comprising:
two polarizing separation members each configured to separate polarization components of a transmitted light;
an absorptive polarizer arranged on optical paths of separated transmitted lights and corresponding to a plane of polarization of each separated transmitted light; and
a Faraday rotator; wherein
   the Faraday rotator is arranged downstream of the absorptive polarizer in a forward direction,
   a half-wave plate is arranged downstream of the absorptive polarizer in the forward direction,
   the first polarizing separation member, the absorptive polarizer next to the first polarizing separation member, the Faraday rotator next to the absorptive polarizer, the half-wave plate next to the Faraday rotator, and the second polarizing separation member next to the half-wave plate are arranged in this order in the forward direction, and
   the polarizing separation members are polarizing prisms.

2. A polarization independent optical isolator comprising:
two polarizing separation members each configured to separate polarization components of a transmitted light;
an absorptive polarizer arranged on optical paths of separated transmitted lights and corresponding to a plane of polarization of each separated transmitted light; and
a Faraday rotator; wherein
   the Faraday rotator is arranged downstream of the absorptive polarizer in a forward direction,
   a half-wave plate is arranged upstream of the absorptive polarizer in the forward direction,
   the first polarizing separation member, the half-wave plate next to the first polarizing separation member, the absorptive polarizer next to the half-wave plate, the Faraday rotator next to the absorptive polarizer, and the second polarizing separation member next to the Faraday rotator are arranged in this order in the forward direction, and
   the polarizing separation members are polarizing prisms.

3. A polarization independent optical isolator comprising:
two polarizing separation members each configured to separate polarization components of a transmitted light;
an absorptive polarizer arranged on optical paths of separated transmitted lights and corresponding to a plane of polarization of each separated transmitted light; and
two Faraday rotators; wherein
   one Faraday rotator is arranged downstream of the absorptive polarizer in a forward direction,
   the other Faraday rotator is arranged upstream of the absorptive polarizer in the forward direction,
   the first polarizing separation member, the first Faraday rotator, the absorptive polarizer next to the first Faraday rotator, the second Faraday rotator next to the absorptive polarizer, and the second polarizing separation member next to the second Faraday rotator are arranged in this order in the forward direction, and
   the polarizing separation members are polarizing prisms.

* * * * *